April 19, 1966  J. W. JACOBS  3,246,593
REFRIGERATING APPARATUS
Filed June 12, 1963  2 Sheets-Sheet 2
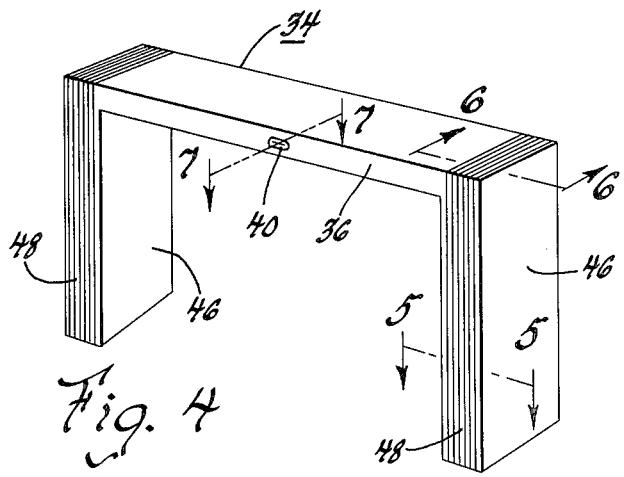
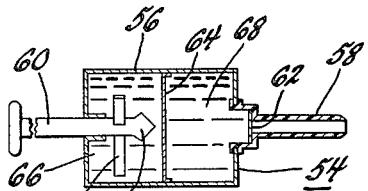
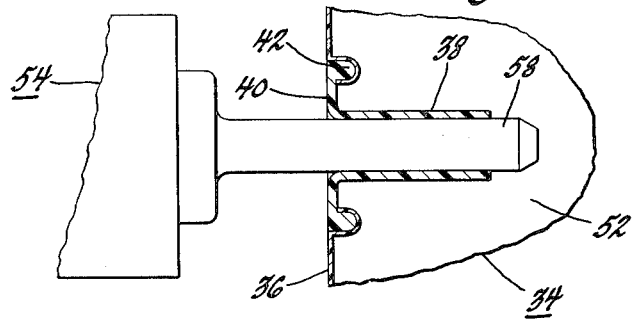
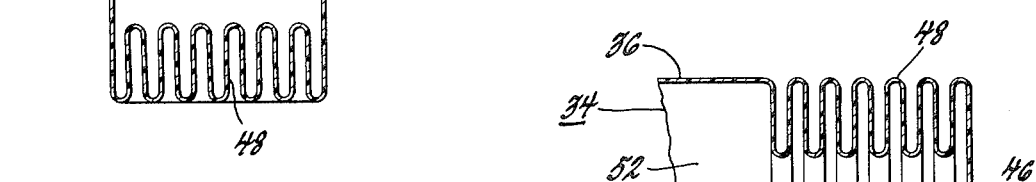
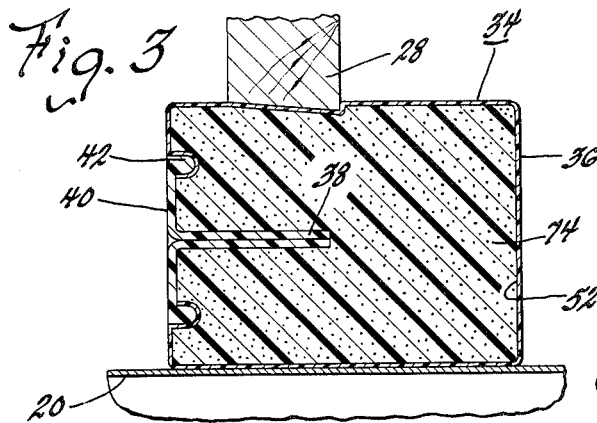
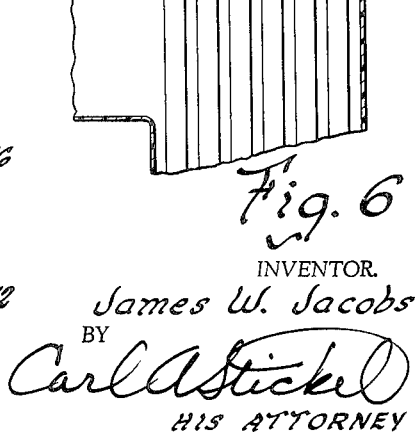
INVENTOR.
James W. Jacobs
BY Carl A. Stickel
HIS ATTORNEY United States Patent Office 3,246,593
Patented Apr. 19, 1966

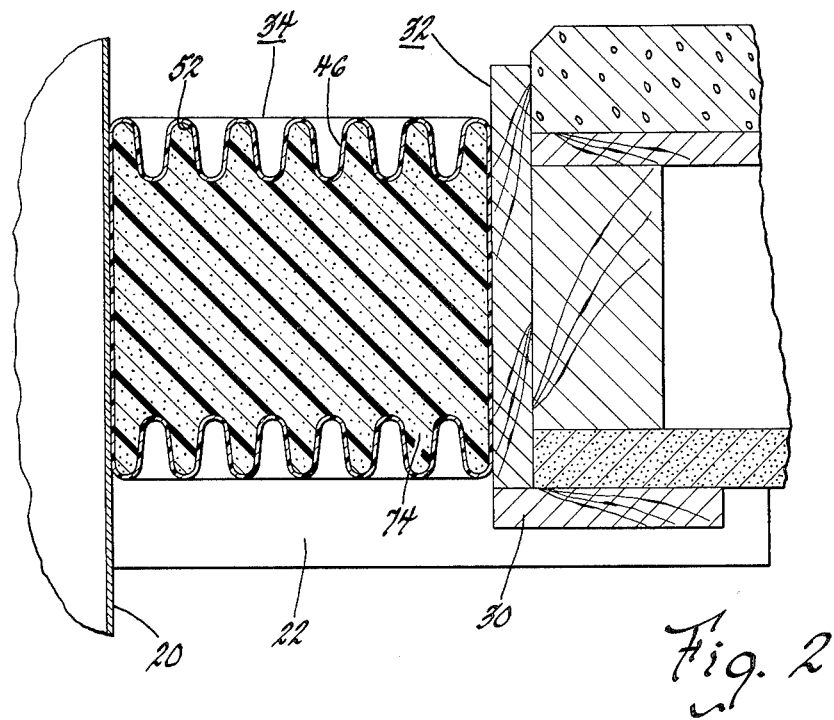
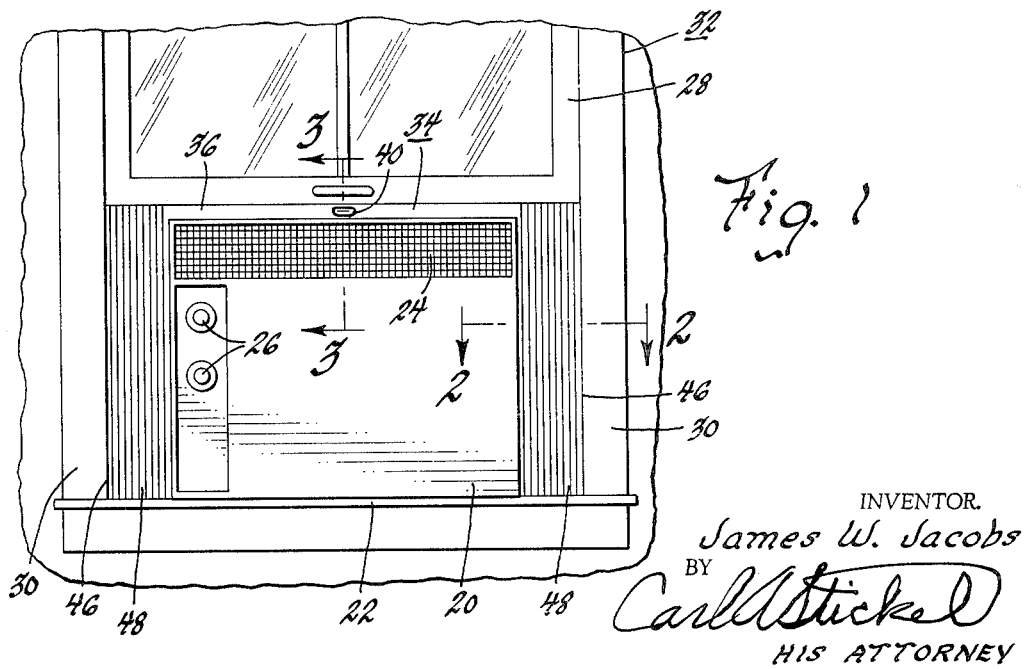

3,246,593
REFRIGERATING APPARATUS
James W. Jacobs, Dayton, Ohio, assignor to General Motors Corporation, Detroit, Mich., a corporation of Delaware
Filed June 12, 1963, Ser. No. 287,345
2 Claims. (Cl. 98—94)

This invention is related in a general way to refrigerating apparatus and fillers for closing openings in a building or other structure and more particularly to window opening fillers for window air conditioners.

The installation of window air conditioners has been a problem. Most window air conditioners have been installed by service men who have cut and trimmed and sealed the fillers for the window openings around the window air conditioners. The cost of such an installation was a deterrent to the sales of window air conditioners. Many mechanical expansible window fillers have been devised, but most are relatively expensive and not sufficiently simple that anyone can use and install them.

It is an object of this invention to provide a filler for an opening in a building or other structure which has insulating properties and which tightly fits the opening and is easily installed.

It is another object of this invention to provide a window opening filler for window air conditioners which is so simple that substantially anyone can install it.

It is another object of this invention to provide a window opening filler for window air conditioners which has no complicated, intricate parts.

It is another object of this invention to provide a window opening filler for window air conditioners which has excellent insulating value and a satisfactory, unobjectionable appearance.

It is another object of this invention to provide a window opening filler for window air conditioners which does not require the use of relatively slidable arrangements.

These and other objects are attained in the form shown in the drawings in which a hollow, expansible member of some flexible material, such as rubber or flexible plastic, extends over the top and sides of the window air conditioner within the window opening. This hollow, expansible member is expanded to fill the space surrounding the window air conditioner within the window opening by charging the interior of the hollow expansible member with a mixture of materials which will generate within the hollow, expansible member a foamed plastic resin. These materials have sufficient expanding power to expand the hollow, expansible members externally into contact with the sides and the top of the window opening and internally into firm contact with the sides and top of the window air conditioner. This assures a relatively tight seal which will not leak air regardless of the irregularities in the window opening. The foamed plastic within the hollow, expansible member also provides excellent insulating properties which will prevent the transfer of heat through the filler.

Further objects and advantages of the present invention will be apparent from the following description, reference being had to the accompanying drawings wherein a preferred embodiment of the present invention is clearly shown.

In the drawings:

FIGURE 1 is a view in elevation of a window opening provided with a window air conditioner and a window opening filler embodying one form of my invention;

FIGURE 2 is a fragmentary horizontal sectional view taken along the line 2—2 of FIGURE 1;

FIGURE 3 is a fragmentary, vertical sectional view taken along the line 3—3 of FIGURE 1;

FIGURE 4 is a perspective view of the window opening filler prior to its expansion;

FIGURE 5 is a fragmentary, horizontal sectional view taken along the line 5—5 of FIGURE 4 prior to the filling of the filler;

FIGURE 6 is a fragmentary, vertical sectional view taken substantially along the line 6—6 of FIGURE 4 prior to the expansion of the filler;

FIGURE 7 is a fragmentary, vertical sectional view taken along the line 7—7 of FIGURE 4 together with a fragmentary view in elevation of an injector for injecting the foam-forming fluids into the hollow, expansible member shown in FIGURE 4; and FIGURE 8 is a vertical, sectional view of one form of injector which may be used to inject the foam forming fluids as illustrated in FIGURE 7.

Referring now to the drawings and more particularly to FIGURE 1, there is shown a window air conditioner 20 resting upon a window sill 22 and having a grill 24 and control knobs 26. The air conditioner 20 is located within a window opening between the window sash 28 and the sill 22. It is also located between the sash frame portions 30 in the window casing 32. Since the air conditioner 20 is narrower than the distance between the two side sash frame portions 30, it is necessary to provide some form of filler to prevent leakage of conditioned air from the room to the outside and to prevent the infiltration of outside air directly into the room. Many relatively complicated and expensive devices have been devised for this purpose. The cost and complications of such devices and the difficulty in installing them have retarded the sales of window air conditioners.

According to my invention, I provide a window filler 34 of hollow plastic material extending over the top and down the sides of the air conditioner 20 filling the space between the air conditioner 20 and the window sash 28 above and the sash frame 30 on either side. The hollow plastic window filler 34 is preferably initially expanded and filled with a rigid or semirigid cellular foam plastic resin which holds the filler in an expanded form in substantially air tight contact with the bottom of the window sash 28 and with the surface of the sash frame 30. However, a flexible foam material may be used if desired.

The filler 34 has a hollow central horizontal portion 36 substantially rectangular in cross section as shown in FIGURE 3. Its bottom rests upon the top of the air conditioner 20 and the window sash 28 rests upon its top surface. At the center of the central portion 36 is provided a flexible charging tube 38 having a flanged entrance portion 40 surrounded by a bead 42 bonded to the adjacent outer wall portions of the central portion 36 as illustrated in FIGURE 3. The charging tube 38 extends into the interior space 52. The side portions 46 are provided with an expansible casing 48 having vertical corrugations extending upon the front and rear face vertically and also horizontally across the top and bottom faces in alignment with the vertical corrugations. However, other forms of expansible configurations may be substituted if desired.

To fill the entire interior 52 of the filler 34, I prefer to employ a portable dispenser 54. This dispenser 54 includes a metal container 56 provided with a discharge tube 58 at one end and a piercing plunger 60 at the opposite end. The dispenser 54 is provided with a thin soft metal partition 62 which closes the inner end of the discharged tube 58. The interior of the dispenser 54 is divided by a thin soft metal partition 64 into two chambers 66 and 68 which contain the two components forming the material for filling the interior 52 of the filler 34. As an example of one component, the chamber 66 may be charged with 88 parts by weight of polymethylene polyphenyl isocyanate. As an example of the other component, the chamber 68 is preferably charged with a mixture composed of 100 parts of sorbitol based polyether, together with 20 parts by weight of a stabilized trichloromonofluoromethane ($F_{11}$) and 2.0 parts of triethylenediamine and 2.0 parts of an organosilicone surface active agent. The polyether preferably has a hydroxyl number 375 and an acid number of less than $\frac{1}{10}$. It is basically made by the reaction of 14 mols of polypropylene oxide to one mol of sorbitol and is commercially known as Atlas 2414 and manufactured by Chemical Industries Inc. All quantities are in parts by weight unless otherwise stated.

The piercing plunger 60 of the chamber 66 preferably is provided with three agitator vanes 70. It also includes a piercing head 72 adapted to easily cut the metal membrane 64 and 62. When it is desired to use the dispenser 54 to fill the filter 34, the piercing plunger 60 is first depressed until it, the piercing head 72, punctures the partition 64. The piercing plunger 60 is then rotated so that the agitating blades 70 will mix the two components in the chambers 66 and 68. The agitating blades 70 are preferably provided with cutting edges so as to cut a major portion of the partition 64 so as to thoroughly mix the components in the chambers 66 and 68. A mechanical vibrator such as is used to mix and agitate the paint in enclosed paint cans may be used in assisting the mixing operation. The dispenser 34 may also be heated moderately to a temperature of about 90° F. to further assist the mixing and dispensing process.

As soon as the contents of the dispenser 54 are sufficiently mixed and sufficient pressure developed, the discharge tube 58 is passed through the charging tube 38, as shown in FIGURE 7, and the plunger 60 is pressed inwardly until it punctures the partition 62. The mixed contents of the dispenser 54 then flow into the interior 52 of the filler 34 to all parts of the interior 52 and expand the filler 34 until it is pressed into contact with the outer surface of the air conditioner 20 and with the adjacent surfaces of the window sash 28 and the sash frames 30. When it is emptied, the dispenser 54 is removed. External pressure on the flexible charging tube 38 will cause it to collapse and close to prevent escape of the foamed resin 74. The foamed resin 74 fills the entire interior 52 and expands the filler 34 filling all the space between the exterior of the air conditioner 20 and the adjacent portions of the window opening.

The foamed resin 74 is light weight and has excellent insulating properties. It has considerable structural strength and it is capable of maintaining the shape of the filler 34. The filler can stand considerable use and is made of materials which have a minimum of deterioration. The filler can readily be removed when the air conditioner is removed and can be used again in the same window when the air conditioner is restored to its place in the window opening. No mechanical skill is required for the installation of the filler. The filler substantially seals and insulates the window opening to prevent any infiltration of air or any substantial transmission of heat.

While the embodiment of the present invention as herein disclosed, constitutes a preferred form, it is to be understood that other forms might be adopted.

What is claimed is as follows:

1. A filler for closing a window opening surrounding an apparatus which includes a hollow expansible member of flexible material extending over the top and on each side of said apparatus within the window opening, said hollow expansible member having corrugated side members, and expansible foam forming plastic resin material disposed within said member and into said corrugations to expand said member to fit the window opening.

2. A filler for closing a window opening surrounding an apparatus which includes a hollow expansible member of flexible material having spaced flexible walls extending over the top and at the side of said apparatus within the window opening, the spaced flexible walls at the side of said apparatus being provided with vertical corrugations extending substantially from the top to the bottom and a cellular semi-rigid polyurethane plastic material bonded in situ within said member permanently holding said member in the shape of said opening and providing insulating means for minimizing heat transfer through said opening, said cellular polyurethane plastic material containing in its cells an insulating gas.

References Cited by the Examiner
UNITED STATES PATENTS

| | | | |
|---|---|---|---|
| 2,782,887 | 2/1957 | Zimmermann | 189—75 |
| 2,812,769 | 11/1957 | Schaefer | 135—1 |
| 3,108,404 | 9/1963 | Lamb | 50—263 |
| 3,128,689 | 4/1964 | Binsfeld | 98—94 |

WILLIAM F. O'DEA, *Primary Examiner.*

ROBERT A. O'LEARY, *Examiner.*